United States Patent
Kim et al.

(10) Patent No.: US 9,648,383 B2
(45) Date of Patent: *May 9, 2017

(54) METHOD AND APPARATUS FOR TRANSMITTING AND RECEIVING A MEASUREMENT REPORT FRAME IN A WIRELESS LOCAL AREA NETWORK SYSTEM

(75) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 868 days.

This patent is subject to a terminal disclaimer.

(21) Appl. No.: 13/641,726

(22) PCT Filed: Nov. 29, 2010

(86) PCT No.: PCT/KR2010/008482
§ 371 (c)(1),
(2), (4) Date: Dec. 28, 2012

(87) PCT Pub. No.: WO2011/132837
PCT Pub. Date: Oct. 27, 2011

(65) Prior Publication Data
US 2013/0205313 A1 Aug. 8, 2013

Related U.S. Application Data

(60) Provisional application No. 61/325,381, filed on Apr. 19, 2010, provisional application No. 61/352,397, (Continued)

(51) Int. Cl.
*H04N 5/50* (2006.01)
*H04N 21/4363* (2011.01)
(Continued)

(52) U.S. Cl.
CPC ......... *H04N 21/43637* (2013.01); *H04N 5/50* (2013.01); *H04N 21/24* (2013.01); *H04N 21/4383* (2013.01); *H04W 16/14* (2013.01)

(58) Field of Classification Search
None
See application file for complete search history.

(56) References Cited

U.S. PATENT DOCUMENTS

2008/0165754 A1* 7/2008 Hu .................... H04W 72/085
370/342
2008/0317062 A1* 12/2008 Timmers et al. ............ 370/462
(Continued)

FOREIGN PATENT DOCUMENTS

KR   10-2009-0030453 A    3/2009
KR   10-2009-0065248 A    6/2009
(Continued)

OTHER PUBLICATIONS

International Search Report issued in corresponding International Patent Application No. PCT/KR2010/008482 dated Aug. 17, 2011.

*Primary Examiner* — Ricky Chin
(74) *Attorney, Agent, or Firm* — Morgan, Lewis & Bockius LLP

(57) ABSTRACT

A method of transmitting and receiving a measurement report frame in a wireless local area network (WLAN) is disclosed. A method of transmitting a measurement report frame form a first station to a second station in a regulatory domain where a licensed device and an unlicensed device are permitted to operate together in a wireless local area network (WLAN) comprising: receiving, at the first station, a measurement request frame from the second station; and transmitting, to the second station, the measurement report frame including a Primary Service Signal Map field indicating which TV channels are occupied by a primary service (Continued)

| Category | Action Value | Requester STA Address | Responder STA Address | Length | Operating Class | Channel Number | Measurement Report Mode | Measurement Start Time | Measurement Duration | Reported DSE LCI fields | Primary Service Signal Map |
|---|---|---|---|---|---|---|---|---|---|---|---|
| Octets: 1 | 1 | 6 | 6 | 2 | 1 | 1 | 1 | 8 | 2 | n x 26 | variable | signal, wherein the primary service signal is a signal that requires protection by regulation.

14 Claims, 11 Drawing Sheets

Related U.S. Application Data filed on Jun. 8, 2010, provisional application No. 61/355,158, filed on Jun. 16, 2010.

(51) Int. Cl.
*H04N 21/438* (2011.01)
*H04W 16/14* (2009.01)
*H04N 21/24* (2011.01)

(56) References Cited

U.S. PATENT DOCUMENTS

| | | | |
|---|---|---|---|
| 2009/0143019 A1* | 6/2009 | Shellhammer | 455/67.11 |
| 2009/0197627 A1* | 8/2009 | Kuffner | H04W 16/14 |
| | | | 455/522 |
| 2010/0046440 A1* | 2/2010 | Singh | H04W 16/14 |
| | | | 370/329 |
| 2010/0048234 A1* | 2/2010 | Singh | H04W 4/20 |
| | | | 455/509 |
| 2010/0124940 A1* | 5/2010 | Hassan | H04L 1/0003 |
| | | | 455/509 |
| 2010/0195580 A1* | 8/2010 | Samarasooriya et al. | 370/329 |
| 2010/0290416 A1 | 11/2010 | Ko et al. | |
| 2010/0309317 A1* | 12/2010 | Wu et al. | 348/180 |
| 2011/0077042 A1* | 3/2011 | Stanforth et al. | 455/512 |
| 2011/0087639 A1* | 4/2011 | Gurney | G06F 17/30442 |
| | | | 707/690 |
| 2011/0107167 A1 | 5/2011 | Lee | |
| 2011/0110349 A1* | 5/2011 | Grandhi | 370/338 |
| 2011/0116458 A1* | 5/2011 | Hsu et al. | 370/329 |
| 2011/0116489 A1* | 5/2011 | Grandhi | H04W 16/04 |
| | | | 370/338 |
| 2011/0194503 A1* | 8/2011 | Stanforth | 370/329 |
| 2011/0222493 A1* | 9/2011 | Mangold | H04B 1/0475 |
| | | | 370/329 |
| 2011/0300891 A1* | 12/2011 | Deb | H04J 11/0023 |
| | | | 455/510 |
| 2012/0307685 A1* | 12/2012 | Kim | H04W 48/16 |
| | | | 370/255 |
| 2012/0307817 A1* | 12/2012 | Chen | H04N 21/2381 |
| | | | 370/338 |
| 2013/0157706 A1* | 6/2013 | Jo | H04W 16/14 |
| | | | 455/512 |
| 2014/0003361 A1* | 1/2014 | Song | H04W 16/14 |
| | | | 370/329 |

FOREIGN PATENT DOCUMENTS

| | | |
|---|---|---|
| KR | 10-2010-0000646 A | 1/2010 |
| KR | 10-2010-0005478 A | 1/2010 |

\* cited by examiner

Fig. 5

| Category | Action Value | Requester STA Address | Responder STA Address | Regulatory Class | Channel Number | Measurement Start Time | Measurement Duration |
|---|---|---|---|---|---|---|---|
| 1 | 1 | 6 | 6 | 1 | 1 | 8 | 2 |

Octets :

Fig. 6

| Category | Action Value | Requester STA Address | Responder STA Address | Length | Operating Class | Channel Number | Measurement Report Mode | Measurement Start Time | Measurement Duration | Reported DSE LCI fields | Primary Service Signal Map |
|---|---|---|---|---|---|---|---|---|---|---|---|
| 1 | 1 | 6 | 6 | 2 | 1 | 1 | 1 | 8 | 2 | n x 26 | variable |

Octets :

|  | One or More TV Channel Numbers |
|---|---|
| Number of TV Channels | TV Channel Number |

Octets:          1                    1

| TV Channel (n+2) | TV Channel (n+3) |
|---|---|

Octets:          0                    1

Fig. 10

| Primary Service Signal Map Type | Primary Service Signal 1 | Primary Service Signal 2 | Primary Service Signal 3 | Primary Service Signal 4 | Primary Service Signal 5 | Primary Service Signal 6 | Primary Service Signal 7 | Primary Service Signal 8 | Reserved |
|---|---|---|---|---|---|---|---|---|---|

Fig. 12

| BBS | OFDM Preamble | Unidentified Signal | Radar/Primary Signal | Unmeasured | Reserved |
|---|---|---|---|---|---|
| 1 | 1 | 2 | 3 | 4 | 5-7 |

Bits:

METHOD AND APPARATUS FOR TRANSMITTING AND RECEIVING A MEASUREMENT REPORT FRAME IN A WIRELESS LOCAL AREA NETWORK SYSTEM

TECHNICAL FIELD

The present invention relates to a wireless local area network (WLAN), and more particularly, to a method of transmitting and receiving a measurement report frame in a wireless local area network (WLAN).

BACKGROUND ART

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4. GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11af.

TV Whitespace includes channels allocated to broadcast TV, which are permitted to be used by cognitive radio device. TV White Space may include UHF band and VHF band. The spectrum not used by a licensed device (hereinafter, can be called as 'White Space') can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. Hereinafter, the term of 'incumbent user' can be collectively used for these terms.

The unlicensed device, which wishes to use the TV White Space (TVWS), shall acquire information for available channel list at its location.

Unlicensed device should provide a protection mechanism for the incumbent user. That is, the unlicensed device should stop using a specific channel, when an incumbent user, such as wireless microphone, is using that specific channel. For this purpose, spectrum sensing mechanism is required. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when DTV (Digital Television) Preamble is detected. And, the unlicensed device (station or Access Point) shall lower its transmission power, when it is detected that the neighboring channel, next to the channel used by the unlicensed device, is used by the incumbent user.

DISCLOSURE OF INVENTION

Technical Problem

An object of the present invention is to provide the spectrum sensing mechanism in order to efficiently operate the unlicensed device on TVWS.

Another object of the present invention is to provide an efficient format of the measurement report.

The object of the present invention is not limited the above stated objects, but includes various objects recited or apparent among the detailed description of the present invention.

Solution to Problem

One aspect of the present invention provides a method of transmitting a measurement report frame from a first station to a second station in a regulatory domain where a licensed device and an unlicensed device are permitted to operate together in a wireless local area network (WLAN) comprising: receiving, at the first station, a measurement request frame from the second station; and transmitting, to the second station, the measurement report frame including a Primary Service Signal Map field indicating which TV channels are occupied by a primary service signal, wherein the primary service signal is a signal that requires protection by regulation.

Here, the Primary Service Signal Map field can include a number of TV channels subfield and at least one TV channel number subfield, wherein the number of TV channels subfield indicates the number of the TV channel number subfields and the TV channel number subfield indicates a number of TV channel on which the primary service signal is detected.

Preferably, the measurement report frame can further include a measurement duration field indicating a measurement duration for which the first station performs sensing, and a TV channel indicated by the TV channel number subfield is a TV channel on which the primary service signal over a certain threshold energy level is detected for the measurement duration.

Preferably, the measurement report frame can further include an operating class field and a channel number field which indicate a WLAN channel the first station performs sensing on.

Preferably, the TV channels correspond to the WLAN channels.

Another aspect of the present invention provides an apparatus of transmitting a measurement report frame to a station in a regulatory domain where a licensed device and an unlicensed device are permitted to operate together in a wireless local area network (WLAN) comprising: a receiver receiving a measurement request frame from the second station; and a transmitter transmitting the measurement report frame including a Primary Service Signal Map field indicating which TV channels are occupied by a primary service signal, wherein the primary service signal is a signal that requires protection by regulation.

Another aspect of the present invention provides a method of receiving a measurement report frame at a first station from a second station in a regulatory domain where a licensed device and an unlicensed device are permitted to operate together in a wireless local area network (WLAN) comprising: transmitting, from the first station, a measurement request frame to the second station; and receiving, from the second station, the measurement report frame including a Primary Service Signal Map field indicating which TV channels are occupied by a primary service signal, wherein the primary service signal is a signal that requires protection by regulation.

Another aspect of the present invention provides an apparatus of receiving a measurement report frame from a station in a regulatory domain where a licensed device and an unlicensed device are permitted to operate together in a wireless local area network (WLAN) comprising: a transmitter transmitting a measurement request frame to the station; and a receiver receiving, from the station, the measurement report frame including a Primary Service Signal Map field indicating which TV channels are occupied by a primary service signal, wherein the primary service signal is a signal that requires protection by regulation.

Advantageous Effects of Invention

According to embodiments of the present invention, the utility of TVWS is increased since an enabling STA knows which TV channel is occupied by an incumbent user.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 5 shows DSE measurement request frame format.

FIG. 6 shows DSE measurement report frame format according to an embodiment of the present invention.

FIG. 10 illustrates second type of Primary Service Signal Map field format according to the embodiment of the present invention.

FIG. 12 illustrates third type of Primary Service Signal Map field format according to the embodiment of the present invention.

BEST MODE FOR CARRYING OUT THE INVENTION

Reference will now be made in detail to the embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
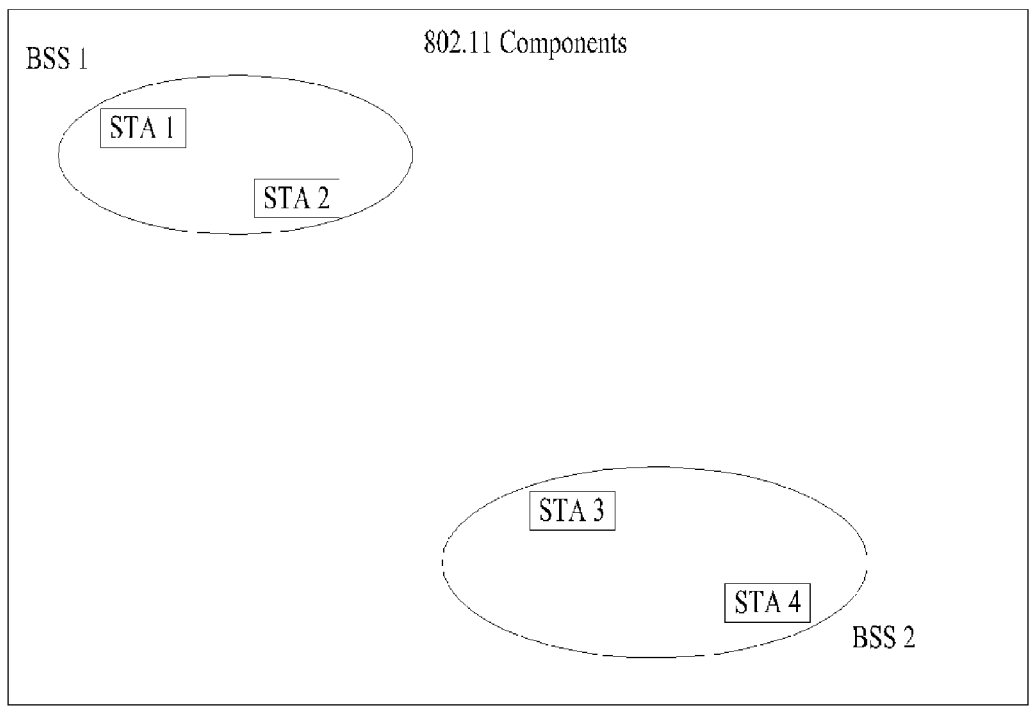
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
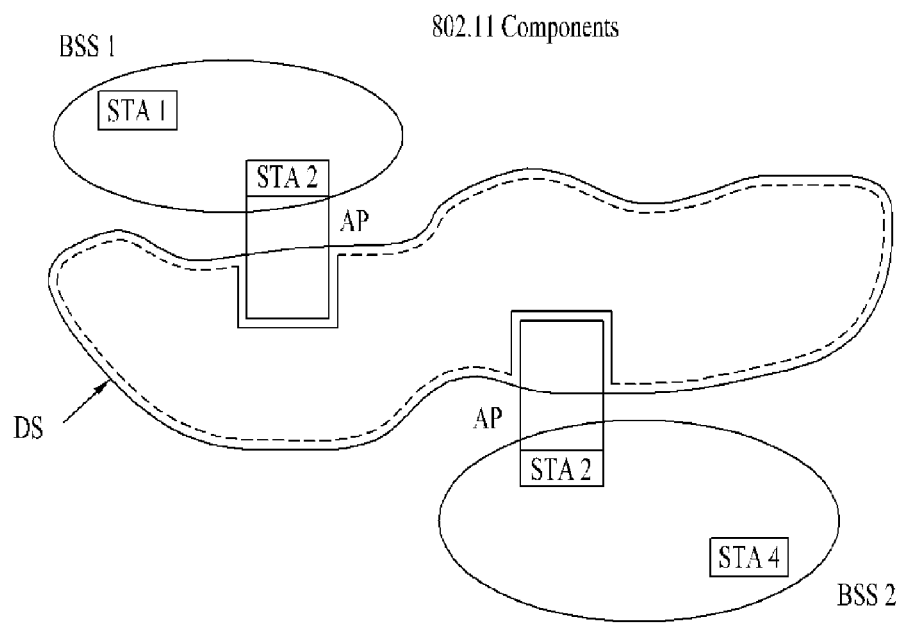
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs; thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1x port access entity. In addition, if the controlled port is authorized, these frames conceptually transit the DS.

Hereinafter, Extended Service Set (ESS) for a large coverage network is explained.

Figure 3:
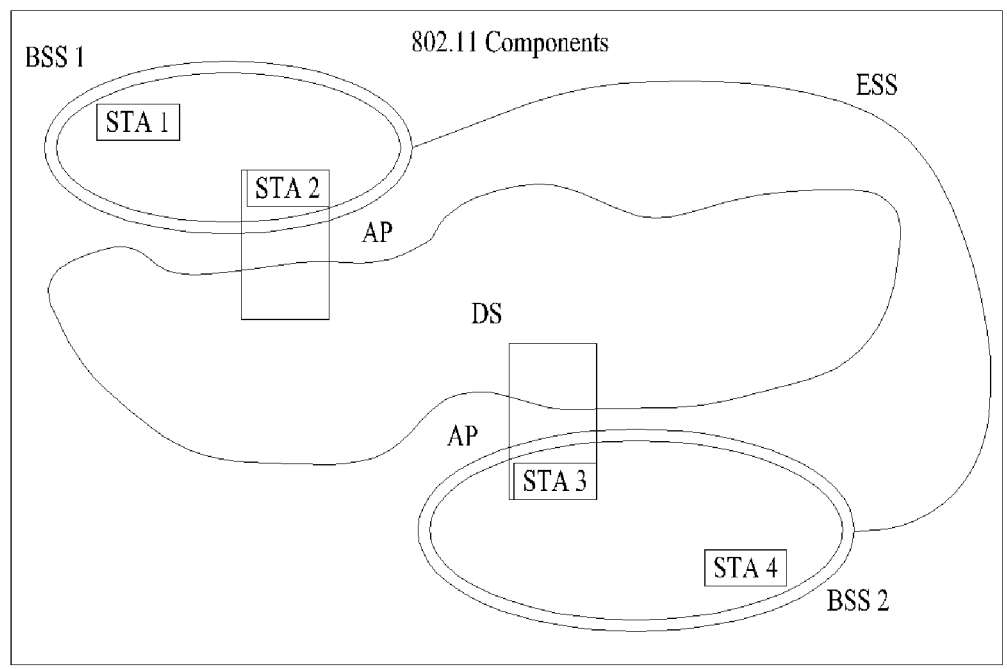
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

The BSSs may partially overlap. This is commonly used to arrange contiguous coverage within a physical volume.

The BSSs could be physically disjoint. Logically there is no limit to the distance between BSSs.

The BSSs may be physically collocated. This may be done to provide redundancy.

One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
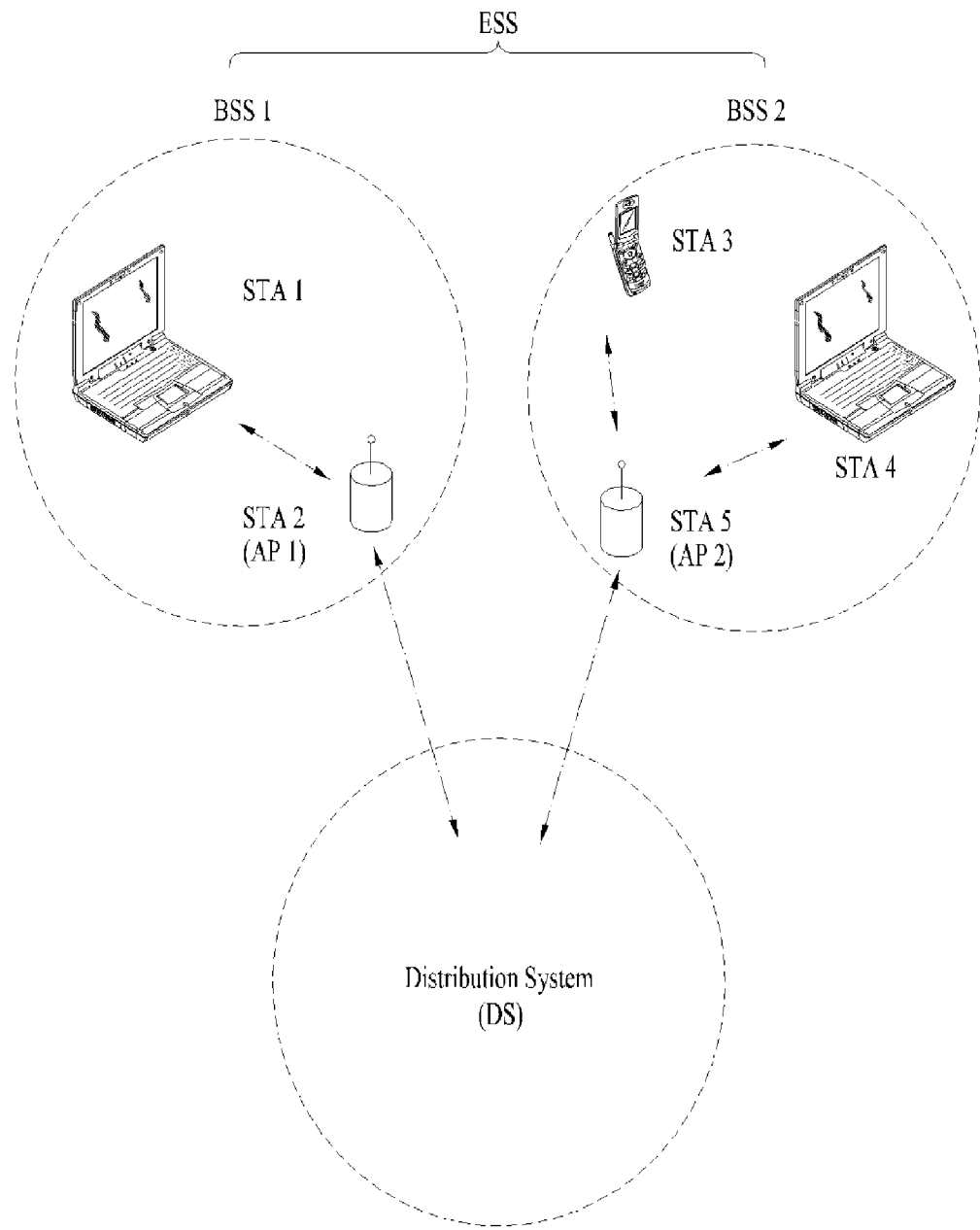
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS. In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. And, non-AP STA, which can operate within TVWS spectrum, can be called as 'Non-AP STA' or 'STA'. AP can corresponds to Base Station (BS), Node-B, BTS (Base Transceiver System), or Femto BS in another field of wireless communication. AP, which can operate within TVWS, can be called as AP.

Based on this understanding, the method of transmitting and receiving a measurement report frame according to the present invention will be explained STA is classified into an enabling STA and a dependent STA. An enabling STA in TVWS is defined as a STA determines the available TV channels at its location using its own geographic location identification and TV bands database access capabilities. A dependent STA in TVWS is defined as a STA receives available TV channel list from the enabling STA or the dependent AP of that enabling STA that enables its operation. Thus, according to the embodiment, enabling STA takes the role to permit the dependent STA to operate within TVWS within the available channels (the role to enable the dependent STA).

In an embodiment of the present invention, an enabling STA or an AP transmits a DSE (Dynamic Station Enablement) measurement request frame to a dependent STA to request the dependent STA to perform spectrum sensing and report spectrum sensing result. And, if a dependent STA receives the DSE measurement request frame, it performs spectrum sensing and transmits a DSE measurement report frame to the enabling STA or the AP.

Spectrum sensing is a procedure that the STA finds whether there is an incumbent user operating on a specific channel for finding the available channel in TVWS. That is, spectrum sensing is for finding whether there is a primary signal on a specific channel. Additionally, the STA can find whether there is a secondary signal on a specific channel, wherein the secondary signal is a signal of an unlicensed device. And, the STA can report TV channels occupied by the unlicensed device.

It is an implementation issue which scheme the dependent STA uses as spectrum sensing mechanism. The dependent STA can use Energy Detection scheme or Signature Detection scheme as spectrum sensing mechanism.

FIG. 5 shows DSE measurement request frame format.

In FIG. 5, DSE measurement request frame comprises Requester STA Address field, Responder STA Address field, Regulatory Class field, Channel Number field, Measurement Start Time field and Measurement Duration field.

Requester STA Address field indicates MAC address of STA transmitting this DSE measurement request frame, and Responder STA Address field indicates MAC address of STA receiving this DSE measurement request frame, performing spectrum sensing and reporting spectrum sensing result.

Regulatory Class field and Channel Number field indicate a WLAN channel the dependent STA shall sense. If the enabling STA or the AP wants the dependent AP to perform spectrum sensing for a regulatory class different from the regulatory class presently used in a BSS, Regulatory Class field is set as a regulatory class different from the regulatory class presently used. For example, if the enabling STA or the AP in a BSS using 10 MHz channel bandwidth wants the dependent AP to perform spectrum sensing for 5 MHz channel bandwidth, Regulatory Class field is set as a regulatory class for 5 MHz channel bandwidth.

Measurement Start Time field indicates time at which the dependent STA shall start spectrum sensing. Measurement Duration field indicates duration for which STA shall perform spectrum sensing.

FIG. 6 shows DSE measurement report frame format according to an embodiment of the present invention.

In FIG. 6, DSE measurement report frame comprises Requester STA Address field, Responder STA Address field, Length field, Operating Class field, Channel Number field, Measurement Report Mode field, Measurement Start Time field, Measurement Duration field, Reported DSE LCI fields and Primary Service Signal Map field. Additionally, DSE measurement report frame can comprise Secondary Service Signal Map field.

Requester STA Address field indicates MAC address of STA transmitting the DSE measurement request frame, and Responder STA Address field indicates MAC address of STA receiving the DSE measurement request frame, performing spectrum sensing and reporting spectrum sensing result. Length field indicates a length of the DSE measurement report frame.

Operating Class field and Channel Number field indicate a WLAN channel the dependent STA sensed. Measurement Report Mode field indicates a type of measurement report. Measurement Start Time field indicates time at which the dependent STA started spectrum sensing. Measurement Duration field indicates a measurement duration for which STA performed spectrum sensing. Reported DSE LCI fields include location configuration information. Reported DSE LCI fields are used to announce registered location of an enabling STA.

Primary Service Signal Map field includes result of spectrum sensing and its length is k octets, wherein k is an arbitrary integer. Primary Service Signal Map field indicates which TV channels are occupied by a primary service signal, wherein the primary service signal is a signal that requires protection by regulation.

If a primary service signal over a certain threshold energy level is detected on a TV channel for the measurement duration, a dependent STA should report the TV Channel number on which the primary service signal is detected.

Secondary Service Signal Map field indicates which TV channels are occupied by an unlicensed device.

If an enabling STA or a AP requests a dependent STA to transmit a measurement report on a specific WLAN channel, which corresponds a plurality of TV channels, and the dependent STA transmits a measurement report indicating primary service signal is detected on the specific WLAN channel, the enabling STA or the AP does not know on which of the plurality of TV channels the primary service signal is detected. Further, as stated above, when the unlicensed device operates on a specific channel and the neighboring channel next to the specific channel is used by an incumbent user, the unlicensed device should lower its transmission power to protect the incumbent user. Thus, if an enabling STA or an AP does not know on which TV channel the primary service signal is detected, the utility of TVWS is reduced. Therefore, the embodiment of the present invention proposes DSE measurement report frame comprising Primary Service Signal Map field indicating which TV channels are occupied by a primary service signal. Additionally, DSE measurement report frame according to the embodiment of the present invention can further comprise Secondary Service Signal Map field indicating which TV channels are occupied by an unlicensed device.

An example of 10 MHz channelization will be explained referring to FIG. 7.

Figures 7, 8, 9:
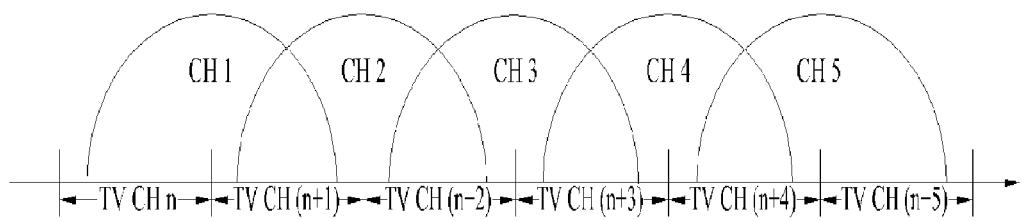
FIG. 7 shows 10 MHz channelization.
FIG. 8 illustrates first type of Primary Service Signal Map field format according to the embodiment of the present invention.
FIG. 9 shows exemplary Primary Service Signal Map field format when primary service signals are detected on TV CH (n+2) and TV CH (n+3).

FIG. 7 shows 10 MHz channelization. TV channel can be 6 MHz, and WLAN channel can be one or more of 5 MHz, 10 MHz, 20 MHz and 40 MHz. FIG. 7 shows 10 MHz channelization of WLAN channel when TV channel is 6 MHz.

In FIG. 7, when an AP requested a measurement report on CH 3, which is 10 MHz and spans the two TV channels and a STA reports a measurement indicating primary service signal is detected, the AP does not know on which of two TV channels a primary service signal is detected, TV CH (n+2) or TV CH (n+3).

In case a primary user signal is detected on TV CH (n+2), CH 2 and CH 3 can't be used by an unlicensed device and the transmission power of CH 1 and CH 4 should be limited. In case a primary signal is detected on TV CH (n+3), CH 3 and CH 4 can't be used by an unlicensed device and the transmission power of CH 2 and CH 5 should be limited.

However, if it is just reported that a primary service signal is detected on CH 3, the CH 2, CH 3 and CH 4 can't be used by an unlicensed device and the transmission power of CH 1 and CH 5 should be limited, which will reduce the utility in TVWS. Considering the larger channel bandwidth that occupies more TV channels, the utility will be decreased drastically.

Since DSE measurement report frame according to the embodiment of the present invention comprises information about which TV channels are occupied by a primary service signal, the utility of TVWS will be increased.

The embodiment of the present invention proposes three types of Primary Service Signal Map field format.

FIG. 8 illustrates first type of Primary Service Signal Map field format according to the embodiment of the present invention.

As show in FIG. 8, the Primary Service Signal Map field includes Number of TV channels subfield and at least one TV Channel Number subfield. Number of TV Channels subfield indicates the number of TV Channel Number subfields and TV Channel Number subfield indicates a number of TV channel on which the primary service signal is detected. The TV channel indicated by the TV Channel Number subfield is a TV channel on which the primary service signal over a certain threshold energy level is detected for the measurement duration.

According to first type of Primary Service Signal Map field format, Primary Service Signal Map field explicitly indicates TV channel numbers on which the primary service signal is detected, the TV channel numbers corresponding to a WLAN channel defined by Operating Class field and Channel Number field of DSE Measurement Report frame.

In example such as FIG. 7, if an enabling STA or a AP requests spectrum sensing on CH 3, and a dependent STA detects primary service signal on TV CH (n+2) and TV CH (n+3), Primary Service Signal Map field explicitly indicates numbers of TV CH (n+2) and TV CH (n+3). FIG. 9 shows exemplary Primary Service Signal Map field format when primary service signals are detected on TV CH (n+2) and TV CH (n+3).

Since in case that 40 MHz channel is supported, 40 MHz channel can include up to 8 TV channels and one TV channel number can be signaled with 1 octet, 8 octets are sufficient for length of Primary Service Signal Map field.

And, types of the detected primary service signals can be specified in DSE Measurement Report frame. There are TV signal, wireless micro-phone, ATSC, NTSC, etc in types of a primary service signal. Operation of an AP and a STA using channels adjacent to a channel on which primary service signal is detected can be changed according to a type of the detected primary service signal. For example, a STA using channels adjacent to a channel on which TV signal is detected should lower maximum transmission power. While general maximum transmission power is 100 mW, maximum transmission power of a channel adjacent to a channel on which TV signal is detected is 40 mW.

a1 Map field in FIG. 6.

The format of Secondary Service Signal Map field can be same as that of Primary Service Signal Map field illustrated in FIG. 8.

The Secondary Service Signal Map field can include Number of TV channels subfield and at least one TV Channel Number subfield. Number of TV Channels subfield indicates the number of TV Channel Number subfields and TV Channel Number subfield indicates a number of TV channel on which the secondary service signal is detected. FIG. 10 illustrates second type of Primary Service Signal Map field format according to the embodiment of the present invention.

As show in FIG. 10, Primary Service Signal Map field comprises Primary Service Signal Map Type subfield and bitmap indicating whether a primary service signal is detected on each of all TV channels corresponding to a WLAN channel defined Operating Class field and Channel Number field in DSE Measurement Report frame. Primary Service Signal Map Type field indicates a type of channelization.

Figure 11:
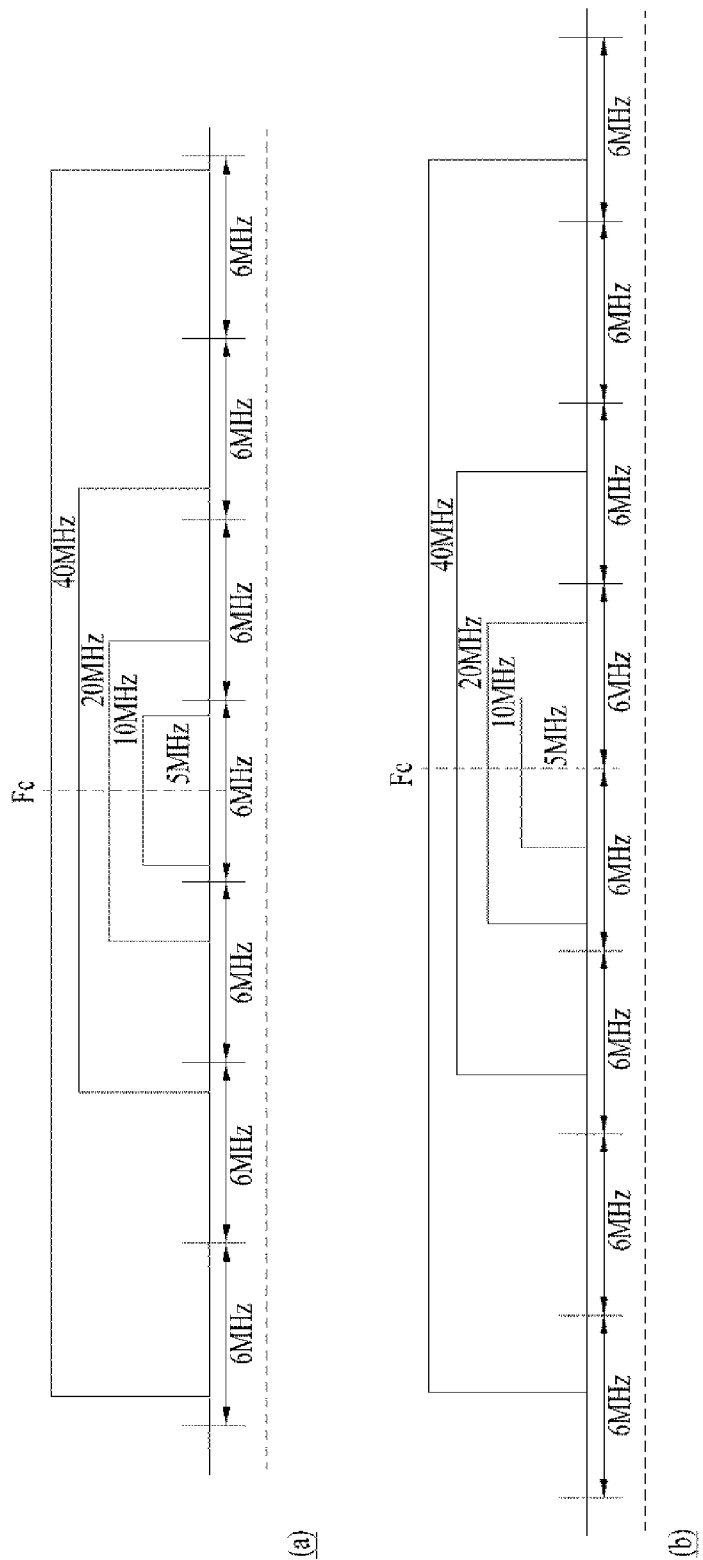
FIG. 11 shows two types of channelization.

FIG. 11 shows two types of channelization.

While a center frequency of a WLAN channel is on a center frequency of a TV channel in FIG. 11(*a*), a center frequency of a WLAN channel is on a boundary of a TV channel in FIG. 11(*b*). Primary Service Signal Map Type field indicates whether a WLAN channel is channelized as a type of channelization FIG. 11(*a*) or FIG. 11(*b*). For example, a value of Primary Service Signal Map Type field is 0, it indicates that a center frequency of a WLAN channel is on a center frequency of a TV channel. And a value of Primary Service Signal Map Type field is 1, it indicates that a center frequency of a WLAN channel is on a boundary of a TV channel.

Since maximum bandwidth of a WLAN channel is 40 MHz and TV channel bandwidth is 6 MHz, one WLAN channel can include up to TV channel. Thus, bitmap in Primary Service Signal Map field may be set to 8 bits. In case that the number of TV channels corresponding to a WLAN channel is less than 8, remaining bits of 8 bits are set to a default value. That is, remaining bits are reserved.

The number of bits used for indicating whether primary service signals are detected is determined based on the number of TV channels corresponding to a WLAN channel. For example, in FIG. 11(*a*), since a 20 MHz channel includes 5 TV channels, the number of bits used for indicating whether primary service signals are detected is 5 bit and 3 bits are reserved.

The number of bits used for indicating whether primary service signals are detected is implicitly determined based on values of Operating Class field and Channel Number field.

Table 1 shows center frequency of a TV channel which each bit of bitmap indicates.

TABLE 1

| Subfield | TV Channel Center Frequency (Primary Service Signal Map Type 0) | TV Channel Center Frequency (Primary Service Signal Map Type 1) |
| --- | --- | --- |
| Primary Service Signal 1 | Channel Center Frequency | Channel Center Frequency + 3 MHz |
| Primary Service Signal 2 | Channel Center Frequency + 6 MHz | Channel Center Frequency − 3 MHz |
| Primary Service Signal 3 | Channel Center Frequency − 6 MHz | Channel Center Frequency + 9 MHz |

TABLE 1-continued

| Subfield | TV Channel Center Frequency (Primary Service Signal Map Type 0) | TV Channel Center Frequency (Primary Service Signal Map Type 1) |
| --- | --- | --- |
| Primary Service Signal 4 | Channel Center Frequency + 12 MHz | Channel Center Frequency − 9 MHz |
| Primary Service Signal 5 | Channel Center Frequency − 12 MHz | Channel Center Frequency + 15 MHz |
| Primary Service Signal 6 | Channel Center Frequency + 18 MHz | Channel Center Frequency − 15 MHz |
| Primary Service Signal 7 | Channel Center Frequency − 18 MHz | Channel Center Frequency + 21 MHz |
| Primary Service Signal 8 | Reserved | Channel Center Frequency − 21 MHz |

In table 1, in case that value of Primary Service Signal Map Type field is 0, Primary Service Signal 1 indicates whether a primary service signal is detected on TV channel whose center frequency is on center frequency of a WLAN channel. And Primary Service Signal 2 indicates whether a primary service signal is detected on TV channel whose center frequency is on center frequency of a WLAN channel+6 MHz.

A method for indicating whether a primary service signal is detected with bitmap can be applied to not only measurement report format of FIG. 6 but also other measurement report formats.

FIG. 12 illustrates third type of Primary Service Signal Map field format according to the embodiment of the present invention.

As shown in FIG. 12, Primary Service Signal Map field includes BSS bit, OFDM Preamble bit, Unidentified Signal bit, Radar/Primary Signal, Unmeasured, BSS bit is set to 1 when a specific BSS of IBSS is operating in the channel. Otherwise, BSS bit is set to 0.

OFDM Preamble bit is set to 1 when PFDM preamble is detected. Otherwise, OFDM Preamble bit is set to 0.

Unidentified Signal bit is set to 1 when detected signal cannot be identified.

Primary service signal/radar bit set to 1 when the measured signal is identified to be a primary service signal/radar that is entitled to protection. Otherwise, the primary service signal/radar bit is set to 0.

Figure 13:
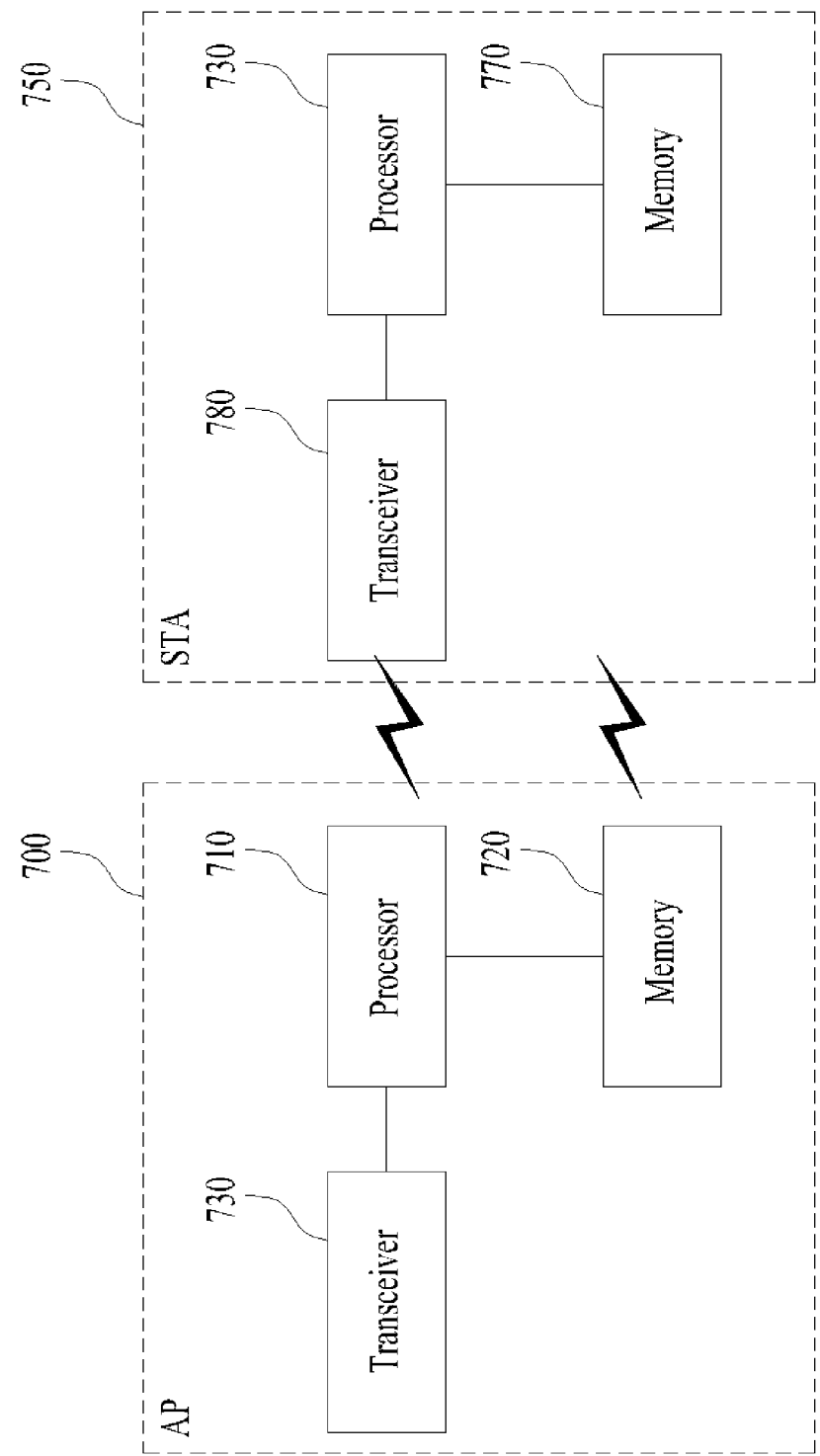
FIG. 13 is a schematic block diagram of wireless apparatuses implementing an exemplary embodiment of the present invention.

FIG. 13 is a schematic block diagram of wireless apparatuses implementing an exemplary embodiment of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 14:
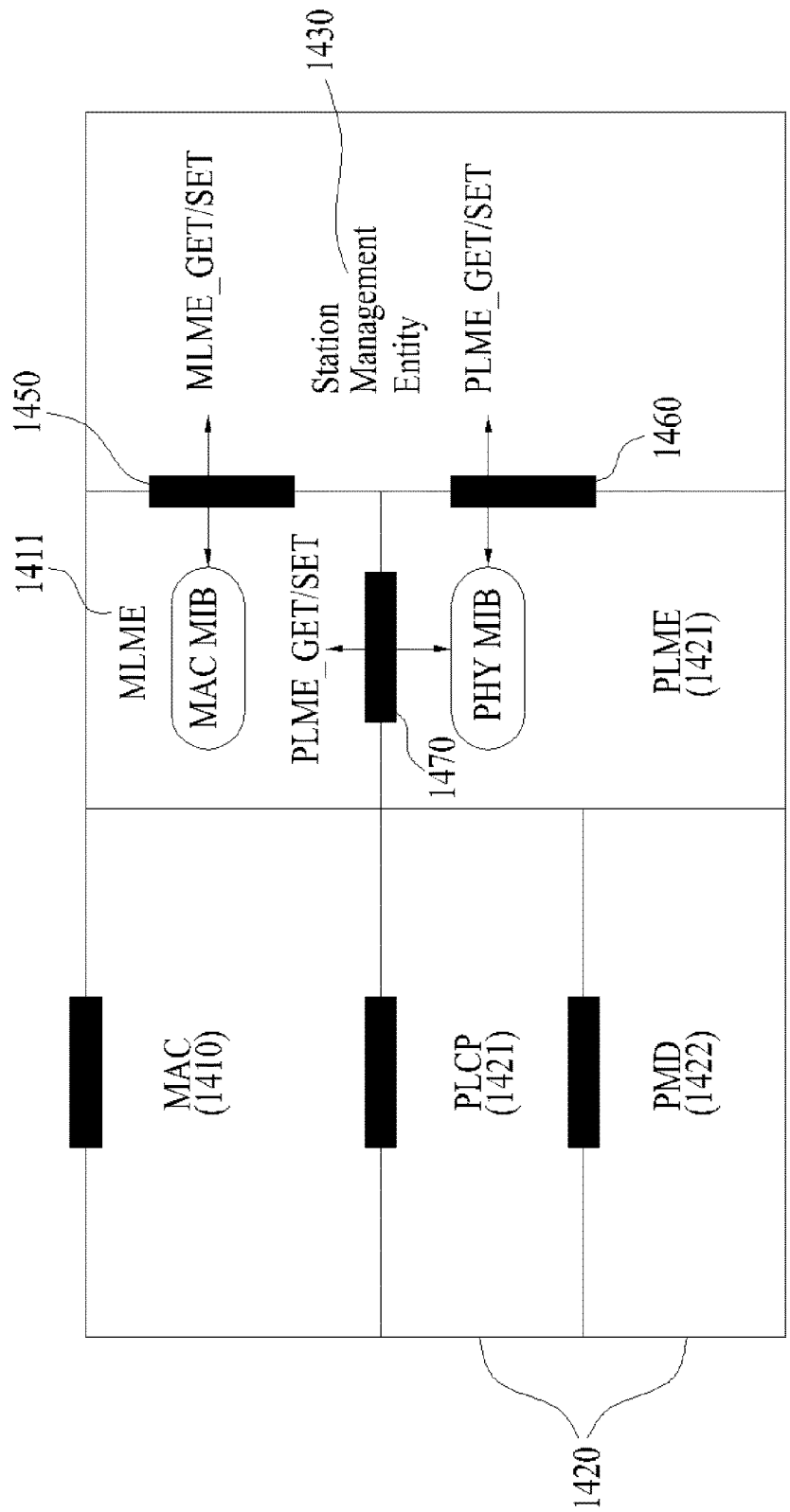
FIG. 14 shows an exemplary structure of processor of STA apparatus according to one embodiment of the present invention.

FIG. 14 shows an exemplary structure of processor of STA apparatus according to one embodiment of the present invention.

Processor 710 or 760 of STA may have multiple layer structures, and FIG. 14 especially focuses on MAC sublayer (1410) on data link layer (DLL) and Physical layer (1420) among these layers. As shown in FIG. 14, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 14 interact in various ways. FIG. 14 shows some examples of exchanging GET/SET primitives. XX-GET.request primitive is used for requesting the value of the given MIBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 14, MLME (1411) and SME (1430) may exchange various MLME_GET/SET primitives via MLME_SAP (1450). According to one example of the present invention, SME (1430) may transmit MLME_WSM.request primitive to MLME (1411) for requesting MLME (1411) to transmit the White Space Map Announcement Frame to another STA. In other case, MLME (1411) may transmit MLME-WSM.indication primitive to SME (1430) to indicate the reception of the White Space Map Announcement Frame from another STA.

Also, as shown in FIG. 14, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the embodiments of the present invention have been disclosed in view of each aspect of the invention, those skilled in the art will appreciate that embodiments of each aspect of the invention can be incorporated. And, there can be advantages not explicitly discussed, since they are obvious from the description for those skilled in the art.

The invention claimed is:

1. A method of transmitting a measurement report frame from a first station to a second station in a regulatory domain in which a licensed device and an unlicensed device are permitted to operate together in a wireless local area network (WLAN), the method comprising:
   receiving, at the first station, a measurement request frame, requesting to measure at least one channel in TVWS (TV White Space), from the second station;
   detecting a primary service signal during a measurement duration based on the measurement request frame; and
   transmitting, to the second station, the measurement report frame, reporting a measurement result of TV channels on which the at least one channel in TVWS is extended,
   wherein the measurement report frame comprises a Primary Service Signal Map field, a primary service signal type field, and a measurement duration field indicating a measurement duration for which the first station performs detecting,
   wherein the Primary Service Signal Map field comprises at least one TV channel number subfield indicating a channel number of a TV channel on which the primary service signal is detected,
   wherein the primary service signal type field indicates a type of each detected primary service signal determined by a type of a device transmitting the primary service signal,
   wherein a value of the primary service signal type field indicates whether the second station should lower a maximum transmit power when the second station transmits a signal to the first station using the adjacent channel of the TV channel on which the primary service signal is detected, and
   wherein a TV channel indicated by the TV channel number subfield is a TV channel on which the primary service signal over a certain threshold energy level is detected for the measurement duration.

2. The method of claim 1, wherein the Primary Service Signal Map field further includes a number of TV channels subfield indicating the number of the TV channels on which the primary service signal is detected.

3. The method of claim 1, wherein the measurement report frame further includes a measurement start time field indicating a time at which the first station started to measure the primary service signal.

4. The method of claim 1, wherein the measurement report frame further includes an operating class field and a channel number field, which indicate a WLAN channel on which the first station performs sensing.

5. The method of claim 4, wherein the TV channels correspond to the WLAN channel.

6. The method of claim 1, wherein the measurement report frame further includes a Secondary Service Signal Map field indicating which TV channels are occupied by the unlicensed device.

7. A first station for transmitting a measurement report frame to a second station in a regulatory domain in which a licensed device and an unlicensed device are permitted to operate together in a wireless local area network (WLAN), the first station comprising:
a transceiver configured to transmit or receive a signal; and
a processor connected with the transceiver, the processor being configured to:
control the transceiver to receive a measurement request frame, requesting to measure at least one channel in TVWS (TV White Space), from the second station;
detect a primary service signal during a measurement duration based on the measurement request frame; and
control the transceiver to transmit, to the second station, the measurement report frame, reporting a measurement result of TV channels on which the at least one channel in TVWS is extended,
wherein the measurement report frame comprises a Primary Service Signal Map field, a primary service signal type field, and a measurement duration field indicating a measurement duration for which the first station performs detecting,
wherein the Primary Service Signal Map field comprises at least one TV channel number subfield indicating a channel number of a TV channel on which the primary service signal is detected,
wherein the primary service signal type field indicates a type of each detected primary service signal determined by a type of a device transmitting the primary service signal,
wherein a value of the primary service signal type field indicates whether the second station should lower a maximum transmit power when the second station transmits a signal to the first station using the adjacent channel of the TV channel on which the primary service signal is detected, and
wherein a TV channel indicated by the TV channel number subfield is a TV channel on which the primary service signal over a certain threshold energy level is detected for the measurement duration.

8. A method of receiving a measurement report frame at a first station from a second station in a regulatory domain in which a licensed device and an unlicensed device are permitted to operate together in a wireless local area network (WLAN), the method comprising:
transmitting, from the first station, a measurement request frame, requesting to measure at least one channel in TVWS (TV White Space), to the second station; and
receiving, from the second station, the measurement report frame, reporting a measurement result of TV channels on which the at least one channel in TVWS is extended,
wherein the measurement report frame comprises a Primary Service Signal Map field, a primary service signal type field, and a measurement duration field indicating a measurement duration for which the second station performs detecting,
wherein the Primary Service Signal Map field comprises at least one TV channel number subfield indicating a channel number of a TV channel on which the primary service signal is detected,
wherein the primary service signal type field indicates a type of each detected primary service signal determined by a type of a device transmitting the primary service signal,
wherein a value of the primary service signal type field indicates whether the first station should lower a maximum transmit power when the first station transmits a signal to the second station using the adjacent channel of the TV channel on which the primary service signal is detected, and
wherein a TV channel indicated by the TV channel number subfield is a TV channel on which the primary service signal over a certain threshold energy level is detected for the measurement duration.

9. The method of claim 8, wherein the Primary Service Signal Map field further includes a number of TV channels subfield indicating the number of the TV channels on which the primary service signal is detected.

10. The method of claim 8, wherein the measurement report frame further includes a measurement start time field indicating a time at which the second station started to measure the primary service signal.

11. The method of claim 8, wherein the measurement report frame further includes an operating class field and a channel number field, which indicate a WLAN channel the second station performs sensing on.

12. The method of claim 11, wherein the TV channels correspond to the WLAN channel.

13. The method of claim 8, wherein the measurement report frame further includes a Secondary Service Signal Map field indicating which TV channels are occupied by the unlicensed device.

14. A first station for receiving a measurement report frame from a second station in a regulatory domain in which a licensed device and an unlicensed device are permitted to operate together in a wireless local area network (WLAN), the apparatus comprising:
a transceiver configured to transmit or receive a signal; and
a processor connected with the transceiver, the processor being configured to:
control the transceiver to transmit a measurement request frame, requesting to measure at least one channel in TVWS (TV White Space), to the second station; and
control the transceiver to receive, from the second station, the measurement report frame, reporting a measurement result of TV channels on which the at least one channel in TVWS is extended,
wherein the measurement report frame comprises a Primary Service Signal Map field, a primary service signal type field, and a measurement duration field indicating a measurement duration for which the first station performs detecting,
wherein the Primary Service Signal Map field comprises at least one TV channel number subfield indicating a channel number of a TV channel on which the primary service signal is detected,
wherein the primary service signal type field indicates a type of each detected primary service signal determined by a type of a device transmitting the primary service signal,
wherein a value of the primary service signal type field indicates whether the first station should lower a maximum transmit power when the first station transmits a signal to the second station using the adjacent channel of the TV channel on which the primary service signal is detected, and wherein a TV channel indicated by the TV channel number subfield is a TV channel on which the primary service signal over a certain threshold energy level is detected for the measurement duration.

\* \* \* \* \*